US007600545B2

(12) United States Patent
Honkanen et al.

(10) Patent No.: US 7,600,545 B2

(45) Date of Patent: Oct. 13, 2009

(54) PROCESSING APPARATUS OF WOOD TO BE CHIPPED

(75) Inventors: Tommi Honkanen, Pori (FI); Ari Havu, Pori (FI); Arvo Jonkka, Pori (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 12/076,398

(22) Filed: Mar. 18, 2008

(65) Prior Publication Data

US 2008/0185073 A1 Aug. 7, 2008

Related U.S. Application Data

(63) Continuation of application No. PCT/FI2006/050422, filed on Oct. 2, 2006.

(30) Foreign Application Priority Data

Oct. 18, 2005 (FI) ................................ 20055558

(51) Int. Cl.
*B23Q 15/00* (2006.01)

(52) U.S. Cl. .................................. 144/382; 144/208.9

(58) Field of Classification Search .............. 144/208.1, 144/208.9, 242.1, 245.1, 245.2, 356, 357, 144/382, 392, 394, 402, 404
See application file for complete search history.

(56) References Cited

U.S. PATENT DOCUMENTS 4,160,937 A 7/1979 Fiorini
4,774,987 A * 10/1988 Sepling .................. 144/208.9
5,247,978 A * 9/1993 Silenius et al. .............. 144/341
6,546,979 B2 * 4/2003 Jonkka ....................... 144/341
7,431,060 B2 * 10/2008 Price et al. .................. 144/340

FOREIGN PATENT DOCUMENTS

| | | |
|---|---|---|
| DE | 503429 | 7/1939 |
| EP | 0203026 A2 | 11/1986 |
| JP | 2002-346420 | 3/2002 |
| SE | 433320 | 5/1984 |
| WO | WO91/17030 A1 | 11/1991 |
| WO | WO03/106125 A1 | 12/2003 |

* cited by examiner

*Primary Examiner*—Shelley Self
(74) *Attorney, Agent, or Firm*—Buchanan Ingersoll & Rooney PC

(57) ABSTRACT

The present invention concerns an apparatus for receiving and feeding into a chipper wood to be chipped, said apparatus containing a feed conveyor receiving log bundles, a tumbling drum breaking the bundles, and a receiving conveyor. The feed conveyor is speed-controlled according to the position information of a log bundle, and the speed of rotation of the tumbling drum is adjusted depending on the amount of wood discharged from the drum. The position information of the log bundle is received for example from the torque moment or input power of the drives of the drum. Thereby the speed of the feed conveyor, respectively the rotation speed of the drum, is set to slow down as a result of the increasing toque moment or input power of the drum, respectively to speed up as a result of the decreasing torque moment or input power.

8 Claims, 3 Drawing Sheets

PROCESSING APPARATUS OF WOOD TO BE CHIPPED

BACKGROUND

1. Field

The disclosure relates to an apparatus to achieve with one processing line a very high uniform feeding capacity of long wood to a chipper. The wood processing apparatus described herein is especially meant for feeding debarked wood to a chipper, delivered as transportation bundles for chipping. Especially considered is the handling of transportation bundles of wood debarked in the forest, to be chipped for the pulp production, so that the wood can be transported to the chipper as an even flow. The wood to be processed has typically a length from 4 to 8 meters.

2. Description of Related Art

The traditional technique comprises a receiving table of log bundles and an unscrambling conveyor by means of which the log bundle placed on the receiving table is broken (discharged) to smaller lots. These smaller lots are fed forward one after another, substantially as a uniform log flow. The logs to be processed have been debarked in advance, especially in connection with the felling, as so called forest debarking. The debarking is not thorough, so that bark, including a share of the loosened bark, is unavoidably carried with the logs, the amount thereof being for example 3% of the wood quantity. The loose bark causes clogging problems on the receiving table and also on the unscrambling conveyor, and should be removed from the log bundles prior to feeding the logs to the chipper. The bark still present on the logs is preferably also removed before the chipper. The conventional apparatus combination including a receiving table and an unscrambling conveyor does not, however, provide any effective tools to remove the bark from the logs. Another problem with the apparatus is in reaching an adequate capacity with short or twisted logs or with logs having a small diameter.

In other techniques, long logs having a length of a whole trunk are transported from the forest unbarked, as truckload bundles, to a debarking drum. Thereby a common problem is that the log bundles are not totally broken in the drum, and an even feed to the chipper is arranged by adjusting the log flow coming from the drum by means of a grab bucket crane moving the logs as smaller batches. However, this technique does not guarantee a sufficient capacity for the system.

Also, logs debarked in the forest could be transported as truckload bundles for chipping. A device, a so-called tumbling drum is used for breaking of the bundles into an even log flow. The tumbling drum in question has a basic implementation corresponding to a debarking drum, in other words, it is substantially a horizontal cylinder, open at its both ends, rotatable about its longitudinal axis, but there are, however, certain differences with respect to the debarking drum.

The tumbling drum must be relatively short, because it is not meant for efficient debarking of the logs. A long tumbling length would increase breaking of the logs and cause wood losses. A typical design is about 1.5 to 3 times the average length of the logs to be processed, preferably about twice the average length of the logs. The diameter of the drum is chosen according to the required capacity, usually ranging from 3 to 6 m. The shell of the drum is usually solid. If necessary, there can be also openings n the shell for eventual discharging of rock material and/or loose bark. The drum is arranged inclining in the flow direction, having an angle of inclination in the flow direction of about 1:30 to 1:100. A suitable receiving and feeding apparatus precedes the drum. A suitable conveyor apparatus is arranged after the drum for feeding the log flow discharged from the transport bundle to be chipped. The conveyor apparatus can be for example a roller conveyor, whereby there is arranged the possibility for the loose bark and the other loose material to drop off from the log flow.

One problem discovered in the devices comprising a tumbling drum is the incomplete breaking of the log bundles. Increasing of the length of the drum is not a recommendable solution to the discovered problem, due to the increasing wood damages mentioned above.

SUMMARY

An essential improvement to the problem has been provided by means of an apparatus described herein, for directing log bundles to a chipper, the apparatus containing, in the flow direction of the logs, a feed conveyor for receiving the log bundles and having a control means for the conveying speed, a through-flow tumbling drum for receiving the log bundles from the feed conveyor and furnished with revolution-controllable drive including a means for indicating the drive load, a position indication means for the bundle relative to the tumbling drum, a receiving conveyor ending to the chipper. Said conveying speed control means is connected to receive a speed control command from said bundle position indicating means.

By means of the controlling system of the apparatus described herein, an even feed of the logs can be achieved, comparable with the receiving system implemented with the receiving table-grab bucket crane technique with respect to the evenness, but superior to that technique with respect to the capacity. In addition, the bark does not cause clogging problems, because the eventually incomplete barking in the forest can be completed in the tumbling drum and the discharge of the bark is performed in the point chosen for this purpose in the assembly.

It has been discovered that a prominent breaking of the bundles happens in the transition point between the feed conveyor and the drum. This stage has proven to be very important, and by increasing its duration, the breaking of the bundles becomes more effective. On the other hand, a new bundle must be received quickly to the drum mouth. For this reason it has been discovered to be an advantage that the speed of the feed conveyor can be adjusted in order to be obtain an adequate transportation speed for achieving the required capacity, and a slow speed when the log bundle is at the mouth of the drum. The control data of the speeds is gained based on the positioning information of the log bundle, for example based on the input power of the drum or the torque of the drives. Also optical systems transmitting the positioning information are useful.

By means of the described method, a relatively effective breaking of the bundles can be achieved in the drum having a length of about twice the length of the log. The amount of wood discharged from the drum, however, varies a lot, and large capacities require still another equalization process. A good equalization of the wood amount discharged from the drum is achieved when using a lower number of revolutions when the amount of wood coming out of the drum is high, and when the amount of wood is decreasing, the number of revolutions is increased in a stepwise or non-stepwise manner. The control of this operation is preferably implemented by means of the torque moment of the drives of the drum, the required information being available for example from the frequency converter required by the speed regulation of the drum. Also equipment based on optical monitoring of the discharged amount of wood is applicable for this purpose.

BRIEF DESCRIPTION OF DRAWINGS

The apparatus and method will be described in more detail in the following with respect to the attached drawings, which are not intended to limit the scope of the disclosed apparatus and method, and wherein.

DETAILED DESCRIPTION OF SPECIFIC EMBODIMENTS

Figure 1:
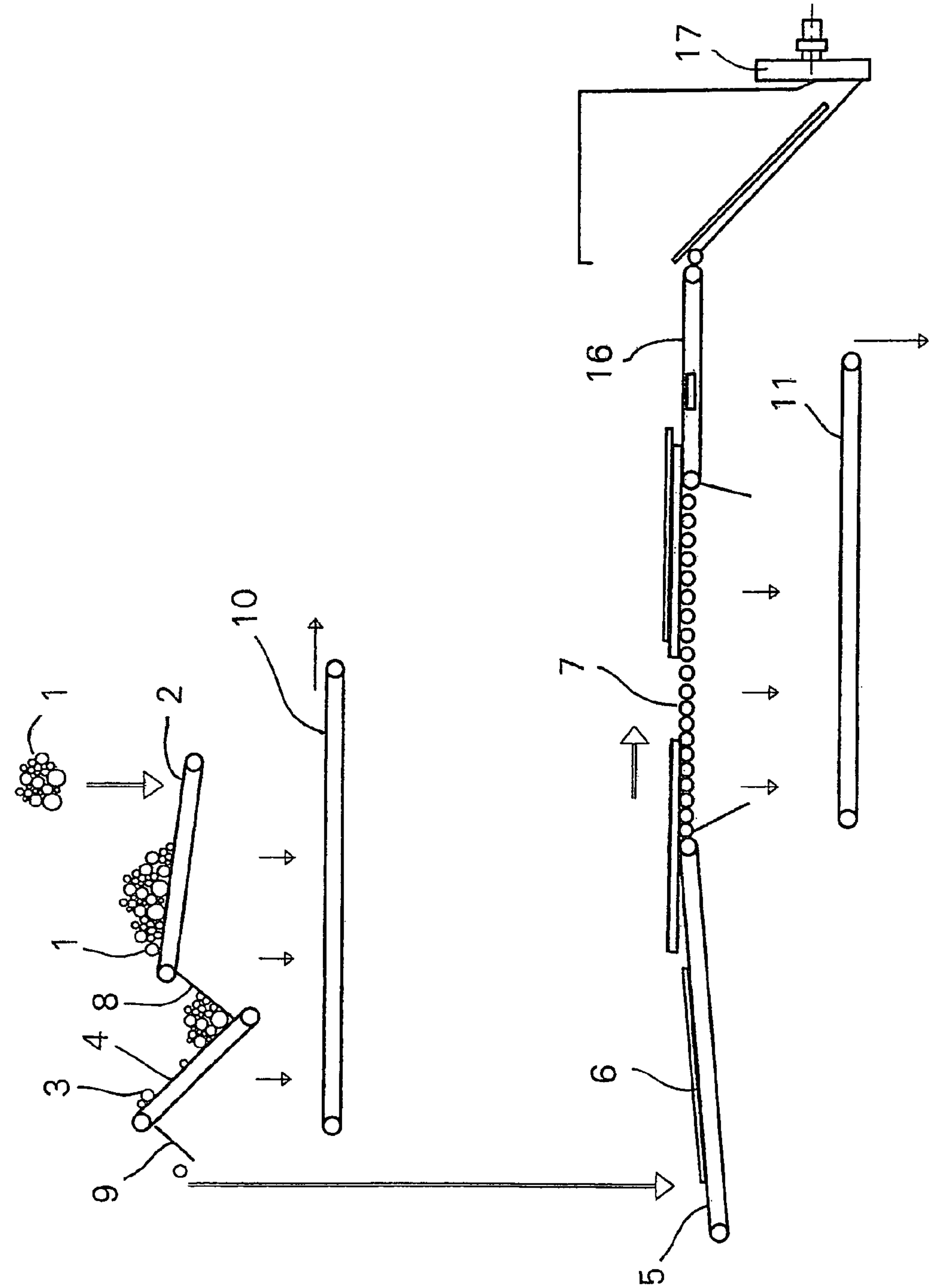
Fig. 1 Prior Art
FIG. 1 is a schematic diagram which shows a traditional chipper feeding line for wood debarked in the forest.

The logs debarked in the forest are fed traditionally with a loader as bundles 1 onto the receiving table 2, FIG. 1. The receiving table 2 is comprised of a drag-chain conveyor being wider than the length of the logs to be transported. The logs are loaded onto the table transversely with respect of the transport direction. The receiving table 2 moves the logs 1 to an unscrambling conveyor 4 being also a drag chain conveyor. Due to the high angle of elevation of the unscrambling conveyor 4, the drags (not shown) take from 1 to 4 logs 3 at a time. The log flow moving from the unscrambling conveyor to the following conveyor 5 is almost even. The conveyor 5 is arranged at an angle of 90 degrees with respect to the transport direction of the unscrambling conveyor 4, so that the logs 6 are set onto the conveyor 5 directed parallel with the transport direction thereof.

The logs are fed by means of a roller assembly 7 and the feed conveyor 16 of the chipper to the chipper 17. The roller assembly 7 separates the loose bark of the logs from the wood flow. The bark falls down onto the bark conveyor 11 under the roller assembly.

Depending on the effectiveness of the debarking performed in the forest, an amount of bark comes with the logs to the process. The bark is partly fixed to the logs and partly loosened. On the receiving table 2 and on the unscrambling conveyor 4 and in the pocket 8 between them, as well as on the chute 9 following the unscrambling conveyor, the loose barks cause jamming and other disturbances. A part of the bark drops under the conveyor, requiring a separate collecting system 10 of bark and waste.

When the diameter of the logs is less than 10 to 15 cm or the length of the logs less than 2 to 3 meters, the log bundles can easily form disordered wood stacks at the unscrambling conveyor 4. Corresponding problems occur also with twisted logs, or when there are lots of long bark stripes among the logs. For good operation of the unscrambling conveyor, the logs must be located parallel in the conveyor pocket 8.

Figure 2:
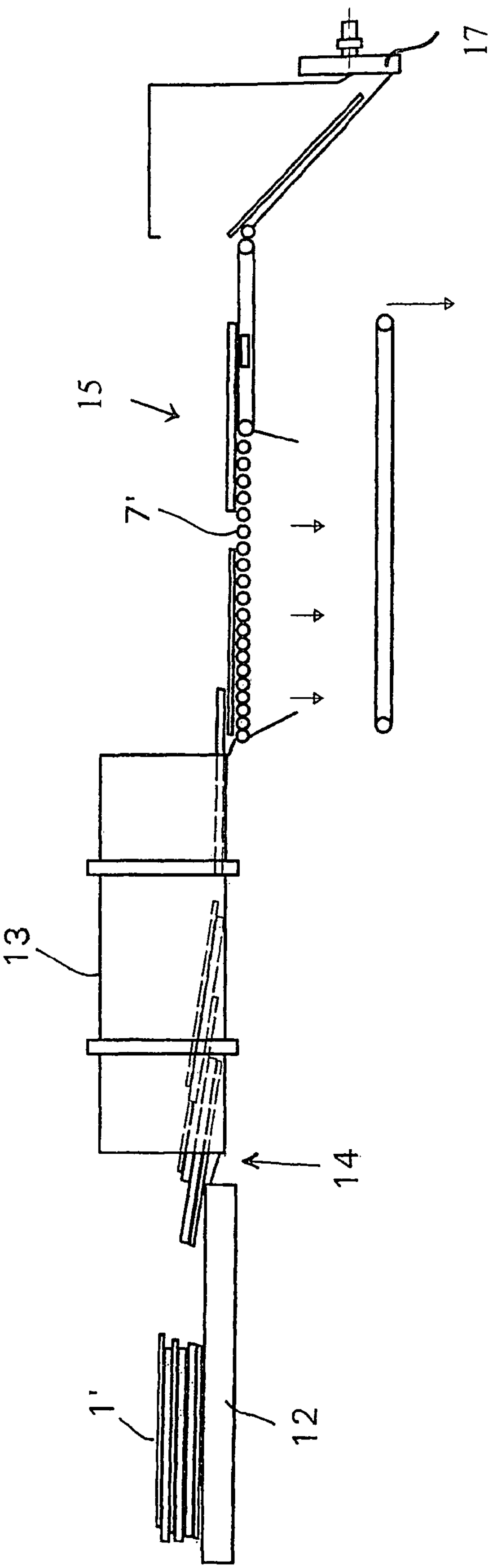
FIG. 2 is a schematic diagram which shows one feeding line of a chipper in accordance with an embodiment described herein.

In FIG. 2, the breaking of the log bundles 1' is implemented by the controlled working of the drum feeder conveyor 12 and the controlled working of the drum 13. The drum feeder conveyor can be a chain conveyor or a beam conveyor. After the drum 13, the logs move to the discharging conveyor of the drum 13, like onto the roller assembly 7'. The loose bark coming with the logs and the bark loosened from the logs in the bundle tumbling drum 13 are separated on the roller assembly 7'.

It has been noted that the most effective breaking of the bundle happens between the feeder conveyor and the drum at transition point 14. By decreasing the transport speed of the bundle, the breaking of the bundle at the transition point 14 between the feeder conveyor and the drum can be made more effective.

Figure 3:
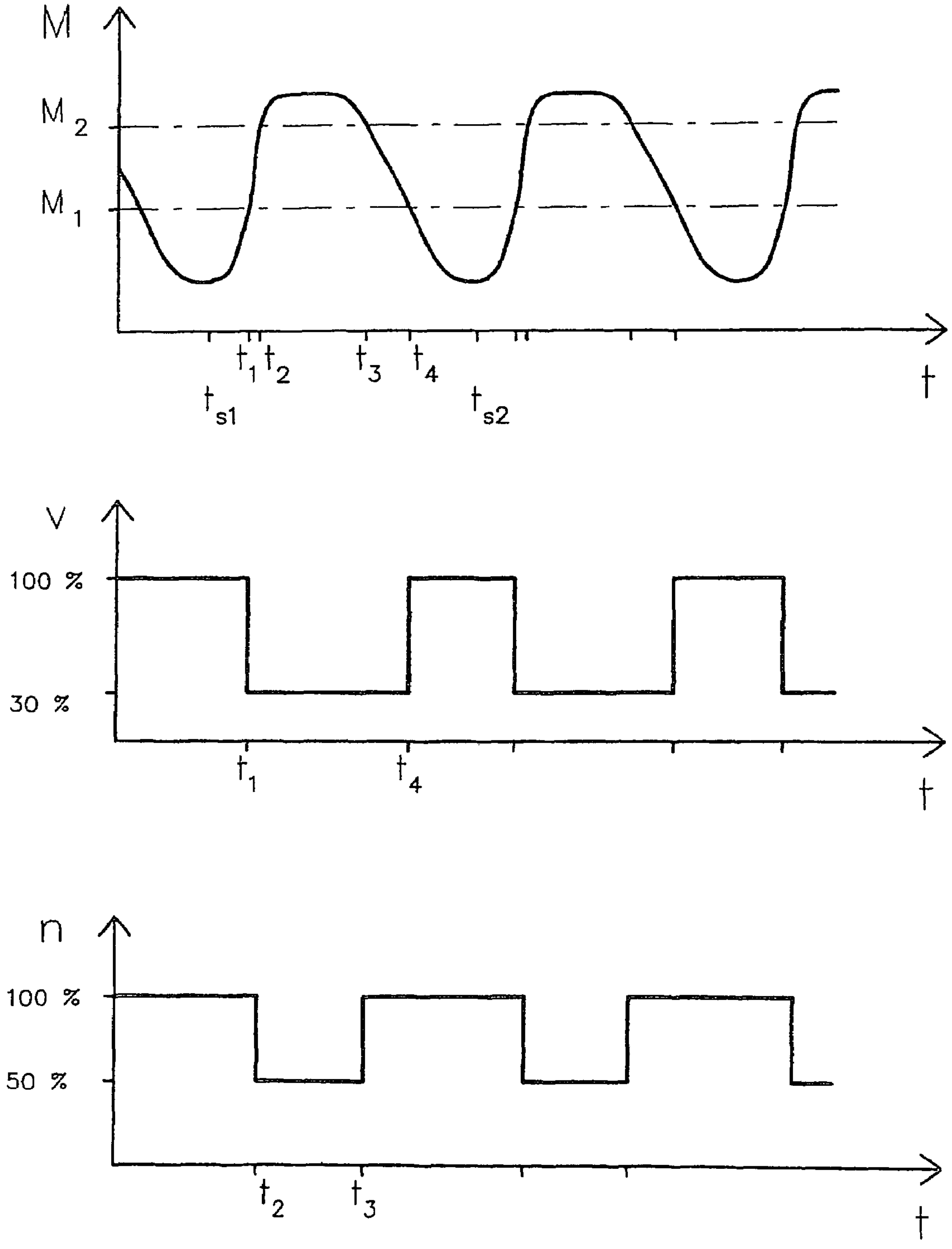
FIG. 3 is a series of graphs that illustrate the use of torque data for controlling the breaking of the bundles.

In the apparatus described herein, the position information of the log bundle can be obtained, for example from the torque moment information of the drives of the drum or from the operational effect, in other words the current information. Diagrams of the FIG. 3 illustrate the moment M of the drum drives, the speed v of the feeder conveyor and the speed of rotation n as a function of time t. The diagrams also show the changes of the above mentioned values when the logs travel through the drum. The changes of the speeds are shown to occur in a stepwise fashion. They can also be carried out in a non-stepwise fashion.

When the bundle proceeds, as the result of the motion of the feed conveyor 12 to the drum 13, in a certain time, $t_{s1}$ (FIG. 3), the log lifters of the drum casing catch the logs. The torque M of the drives increases strongly, and the wood bundle tends to rotate together with the drum. When the torque reaches the value $M_1$, at the time $t_i$, the controller tells the drum feeder conveyor to drop the speed to, for example, 30 percent of the maximal speed (FIG. 3). The transferring of the bundle into the drum slows down, providing an adequate breaking of the bundle. When the logs start to loosen, the torque of the drum starts to fall. When the torque is decreased to value $M_1$, once more, at the time $t_4$, the controller tells the feeder conveyor to return to the full speed (100%). In that way a new bundle is quickly received to the transition point 14 between the drum and the feed conveyor, in the diagram M/t of FIG. 3 at the time $t_{s2}$. Increasing and decreasing of the speed is not necessarily happening with the same value M of the torque but they can also be chosen, and varied case by case.

In order to maintain a capacity with an adequate evenness, also the speed of rotation n of the drum changes according to the torque information of the drum, as shown in the diagram nit of FIG. 3. At the time $t_2$ as the torque reaches the value $M_2$, the speed of rotation n of the drum is decreased for example to half (50%) of the maximum speed (100%). In that way, the overcapacity in the feeding line 15 of the chipper, after the drum, is avoided.

When the amount of logs has decreased in the drum and the torque decreases back to the value $M_2$ at the time $t_3$, the speed of rotation of the drum is increased back to its maximum value (100%). Also, herein the increasing and decreasing of the speed is preferably chosen case by case and they need not happen with the same torque value or alternatively the same current value of the drives.

The adjustment shown in FIG. 3 is illustrated to occur in a stepwise fashion. The adjustment is in that case simple and easily implemented. The operation according to the invention can also be implemented in a non-stepwise fashion without predetermined limit values. The adjustment control is in that case much more demanding, but as an advantage, better operation and less mechanical stresses are achieved as an advantage due to the speed changes. Another parameter which may have influence on the throughput capacity of the drum is the changing of the angle of inclination of the drum, for example by means of a lifting/lowering device having influence on the height position of the support rolls.

The present invention having been described herein with respect to its specific embodiments, it will be apparent that other embodiments which do not depart from the spirit of the invention are encompassed by the appended claims.

The invention claimed is:

1. An apparatus for receiving and feeding into a chipper wood to be chipped, said apparatus comprising, in the flow direction of the wood:

a feed conveyor for receiving and transporting log bundles to a through-flow tumbling drum, a through-flow tumbling drum for receiving the log bundles from the feed conveyor, rotating to break the bundles into separate logs, and providing the resulting separate logs to a receiving conveyor, a revolution-controllable drum drive associated with the through-flow drum, a drum drive load indicator, a log bundle position indicator, a receiving conveyor for receiving separate logs from the through-flow tumbling drum, and a controller for controlling a duration time spent by the log bundles between the feed conveyor and the through-flow tumbling drum by controlling the speed of the feed conveyor, or the speed of rotation of the tumbling drum, or both, comprising a log bundle position input connected to the log bundle position indicator, which provides the controller with position information of a log bundle, or a discharged wood amount input connected to the drum drive load indicator which provides the controller with information about the amount of wood discharged from the tumbling drum, or both;

wherein the controller operates the feed conveyor at a speed that is controlled based on position information of a log bundle that is received by the controller, or wherein the tumbling drum is rotated at a speed that is adjusted based on information about the amount of wood discharged from the tumbling drum that is received by the controller, or both, in order to control the duration of time of transition between the feed conveyor and the through-flow tumbling drum.

2. An apparatus according to claim 1, wherein the drum drive load indicator and the log bundle position indicator are the same, and provide information on the torque moment or input power of the revolution-controllable drum drive, wherein the controller controls the speed of the feed conveyor and adjusts the speed of rotation of the tumbling drum based on information on torque moment or input power of the revolution-controllable drum drive and wherein the controller adjusts the speed of the feed conveyor, or the speed of rotation of the drum, or both, so that the speed of the feed conveyor, or the speed of rotation of the drum, or both, has been set to slow down when torque moment or input power increase, and to speed up when torque moment or the input power decrease, respectively.

3. An apparatus according to claim 1, wherein the controller changes the speed of the feed conveyor, or the speed of rotation of the drum, or both, in a non-stepwise fashion.

4. An apparatus according to claim 1, wherein the controller changes of the speed of the feed conveyor, or the speed of rotation of the drum, or both, in a stepwise fashion.

5. An apparatus according to claim 2, wherein the controller changes of the speed of the feed conveyor, or the speed of rotation of the drum, or both, in a non-stepwise fashion.

6. An apparatus according to claim 2, wherein the controller changes of the speed of the feed conveyor, or the speed of rotation of the drum, or both in a stepwise fashion.

7. An apparatus according to claim 5, wherein the controller changes of the speed of the feed conveyor, or the speed of rotation of the drum, or both, in a stepwise fashion.

8. An apparatus according to claim 1, further comprising an optical system for transmitting said position information.

* * * * *